United States Patent
Bragd et al.

(10) Patent No.: US 6,608,229 B2
(45) Date of Patent: Aug. 19, 2003

(54) OXIDATION OF POLYSACCHARIDES WITH NITROXYLS

(75) Inventors: Petter Bragd, Utrecht (NL); Arie Cornelis Besemer, Amerongen (NL); Jeffrey Wilson Thornton, Huizen (NL)

(73) Assignee: SCA Hygiene Products Zeist B.V. (NL)

( * ) Notice: Subject to any disclaimer, the term of this patent is extended or adjusted under 35 U.S.C. 154(b) by 0 days.

(21) Appl. No.: 09/841,083

(22) Filed: Apr. 25, 2001

(65) Prior Publication Data

US 2001/0034442 A1 Oct. 25, 2001

(30) Foreign Application Priority Data

Apr. 25, 2000 (EP) .............................. 00201461

(51) Int. Cl.[7] .................. C07C 45/37; C07C 51/16; C08B 31/18; C07H 1/00; C07B 33/00
(52) U.S. Cl. ................ 568/432; 568/436; 568/437; 568/484; 536/104; 536/105; 536/123.1; 536/124; 554/138; 562/419; 562/515
(58) Field of Search ................ 536/104, 105, 536/123.1, 124; 554/138; 562/419, 515; 568/432, 436, 437, 484

(56) References Cited

FOREIGN PATENT DOCUMENTS

| DE | 197 46 805 | 4/1999 |
|---|---|---|
| WO | 95/07303 | 3/1995 |
| WO | 98/27117 | 6/1998 |
| WO | 99/23240 | 5/1999 |

OTHER PUBLICATIONS

Nooy et al. "Highly selective nitroxyl radical–mediated oxidation of primary alcohol groups in water–soluble glucans". Carbohydrate Research 269. (1995) pp. 89–98.*

* cited by examiner

Primary Examiner—Johann Richter
Assistant Examiner—Sikarl A. Witherspoon
(74) Attorney, Agent, or Firm—Burns, Doane, Swecker & Mathis, L.L.P.

(57) ABSTRACT

A simplified process for oxidizing starch and other polysaccharides in an aqueous solution or suspension using hypochlorite in the presence of a catalytic amount of a nitroxyl compound is described. The oxidation is process is bromide-free and is carried out at a pH between 7 and 8.3 and at a temperature between 15 and 25° C.

5 Claims, No Drawings

OXIDATION OF POLYSACCHARIDES WITH NITROXYLS

The present invention relates to a process for oxidizing starch and other polysaccharides in an aqueous medium using hypochlorite in the presence of a nitroxyl compound.

BACKGROUND

WO 95/07303 discloses a process for oxidizing polysaccharides including starch, using hypochlorite TEMPO (tetramethylpiperidine-N-oxyl) in the presence of a catalytic amount of bromide at a pH between 9 and 13 at a temperature between −5 and +10° C. This process results in selective oxidation of the hydroxymethyl group at the 6-position of the anhydroglucose units to a carboxyl group. In example IV of this document, the effect of bromide was studied and the results suggest that no complete reaction can be achieved in the absence of bromide.

The TEMPO-mediated oxidation of starch is also described in DE-19746805. The reaction conditions according to this teaching are: use of about 7.5 mmol TEMPO and about 110 mmol bromide per mol starch, room temperature and a pH between 7 and 9.

WO 99/23240 discloses the oxidation of starch with TEMPO and oxygen using an enzyme (laccase). As a reference, chemical oxidation with TEMPO and hypochlorite and bromide at pH 10.8 at 0° C. is described.

The current teaching is to always use bromide as a co-catalyst in the TEMPO-mediated oxidation of carbohydrates, as the absence of bromide is thought to be detrimental to the yield and purity (chain degradation) of the polymeric product. However, the use of bromide is undesired because it is corrosive and is environmentally hazardous.

SUMMARY OF THE INVENTION

It was surprisingly found according to the invention that starch and related polysaccharides can be oxidized with hypochlorite and TEMPO at near-neutral conditions in the absence of a bromide catalyst without any loss on selectivity for 6-oxidation or yield. It was found that the only effect of bromide on the TEMPO-mediated oxidation is on the reaction kinetics, which effect can advantageously be compensated for by raising the temperature to ambient temperature. The pH optimum was found to be lower (about pH 8–9) than with bromide catalysis (about pH 10). Also, no substantial depolymerization was found around the pH optimum. The reaction rate at ambient temperatures is equal to that of the bromide catalysed reaction performed at about 2° C., which constitutes a practical advantage.

Advantageously the results in terms of depolymerization and other undesired side-reactions at ambient temperatures are about the same as the bromide process carried out at low temperatures, and is better than the bromide process carried at ambient temperatures. Thus the process of the invention is characterized in that this oxidation is carried out in the absence of a bromide (or other halide) catalyst, at a pH between 7 and 9.3 and at a temperature between 15 and 25° C.

DETAILED DESCRIPTION

The preferred pH depends on the particular type of nitroxyls. For most nitroxyls such as unsubstituted TEMPO and 4-hydroxy-TEMPO, the preferred pH is between 8.0 and 9.5, especially between 8.3 and 9.0, whereas for 4-acetamido-TEMPO the preferred pH is between 7.5 and 8.2.

Polysaccharides that can be oxidized using the process of the invention should contain a hydroxymethyl group, for example at the 6-position of the monosaccharide unit. Such polysaccharides include the starch-type polysaccharides (α-1,4-glucans), pullulan and other α-1,3-glucans, cellulose-type polysaccharides (β-1,4-glucans) and other β-glucans such as chitin, fructans, galacto- and glucomannans (guar and the like), xyloglucans, etc.

The process of the invention is particularly concerned with the oxidation of starch and starch analogues and derivatives, such as gelatinized starch, hydrolysed starch, amylose, amylopectin, alkylated, hydroxyalkylated, carboxyalkylated, aminoalkylated, acylated starch etc. The only requirement is that at least a part of the 6-hydroxyl functions is still available as such. The degree of oxidation to be achieved with the process can be determined on the basis of the intended use, by choosing the appropriate amount of hypochlorite. Hypochlorite can be used as such or as a precursor, e.g. as molecular chlorine. At low degree of oxidation, a mixture of 6-aldehyde-starch and 6-carboxystarch is obtained, while at high degrees of oxidation (e.g. more than 50%), 6-carboxy-starch is the predominant product. For complete oxidation to 6-carboxy starch, two moles of hypochlorite are required per mole of starch unit (i.e. anhydroglucose unit). If an aldehyde-free product is desired at partial oxidation, any aldehyde product can be either reduced to the alcohol, e.g. with borohydride, or oxidized to the carboxyl product, e.g. with sodium chlorite.

The nitroxyl compound to be used can be any organic nitroxyl compounds lacking α-hydrogen atoms, such as 2, 2, 6, 6-tetramethylpiperidine-N-oxyl (TEMPO), 2, 2, 5, 5-tetramethylpyrrolidine-N-oxyl (PROXYL), 4-hydroxy-TEMPO, 4-acetamido-TEMPO and other derivatives thereof. It is preferred to use a relatively low amount of TEMPO, in particular between 3 and 7.2 mmol of nitroxyl compound per mole of starch unit.

EXAMPLE

Potato starch (12.2 g; 10.0 g dry weight: 62 mmol) was gelatinized in demineralized water (450 ml) at 95° C. under mechanical stirring. The solution was then slowly cooled to 20° C. TEMPO (4–8 mg per g of starch) was dissolved in the starch solution. A hypochlorite solution (concentration 2.0 mol/l) was added in portions of 2 ml. In total 86 mmoles were added, corresponding to a theoretical degree of oxidation of 70%. The pH was kept at 8.5 by addition of 0.5M NaOH controlled by a pH-stat. After completion of the reaction, remaining carbonyl intermediates were reduced back to the alcohol by sodium borohydride (0.2 g). The oxidized material was precipitated in 2 volumes of ethanol, separated by filtration, rinsed with acetone and dried in a vacuum oven at 30° C. The product was then redissolved in water, ion-exchanged (Dowex 50WX8-100 cation exchanger, Sigma) and freeze-fried, to remove salts and to convert carboxylates to the protonated form. $^{13}C$ NMR ($D_2O$) δ (ppm): 99.2 (C-1), 73.2, 73.7, 74.0, 74.5 (C-2-5), 61.7 (C-6), 177.6 (C-6 oxidized). The isolated yield was over 90%, with a degree of oxidation of 65%. Size exclusion chromatography showed very little depolymerization. The elution pattern was almost identical to the pattern resulting from oxidation using bromide at 2° C. and it showed less decomposition compared to oxidation using bromide at 20° C.

We claim:

1. A process for oxidizing polysaccharides in an aqueous solution or suspension using hypochlorite in the presence of a catalytic amount of a nitroxyl compound, comprising carrying out the oxidation in the absence of a bromide catalyst, at a pH between 7.3 and 8.3 and at a temperature between 15 and 25° C. to obtain an oxidized polysaccharide containing 6-aldehyde and/or 6-carboxyl groups, substantially without depolymerization.

2. A process according to claim 1, wherein between 3 and 7.2 mmol of nitroxyl compound is used per mole of monosaccharide unit.

3. A process according to claim 1, wherein the nitroxyl compound is TEMPO (tetramethylpiperidine-N-oxyl) or 4-hydroxy-TEMPO.

4. A process according to claim 1, wherein the nitroxyl compound is 4-acetoxy-TEMPO.

5. A process according to claim 1, wherein the polysaccharide is selected from the group consisting of starch and starch derivatives.

\* \* \* \* \*